Patented Aug. 22, 1950

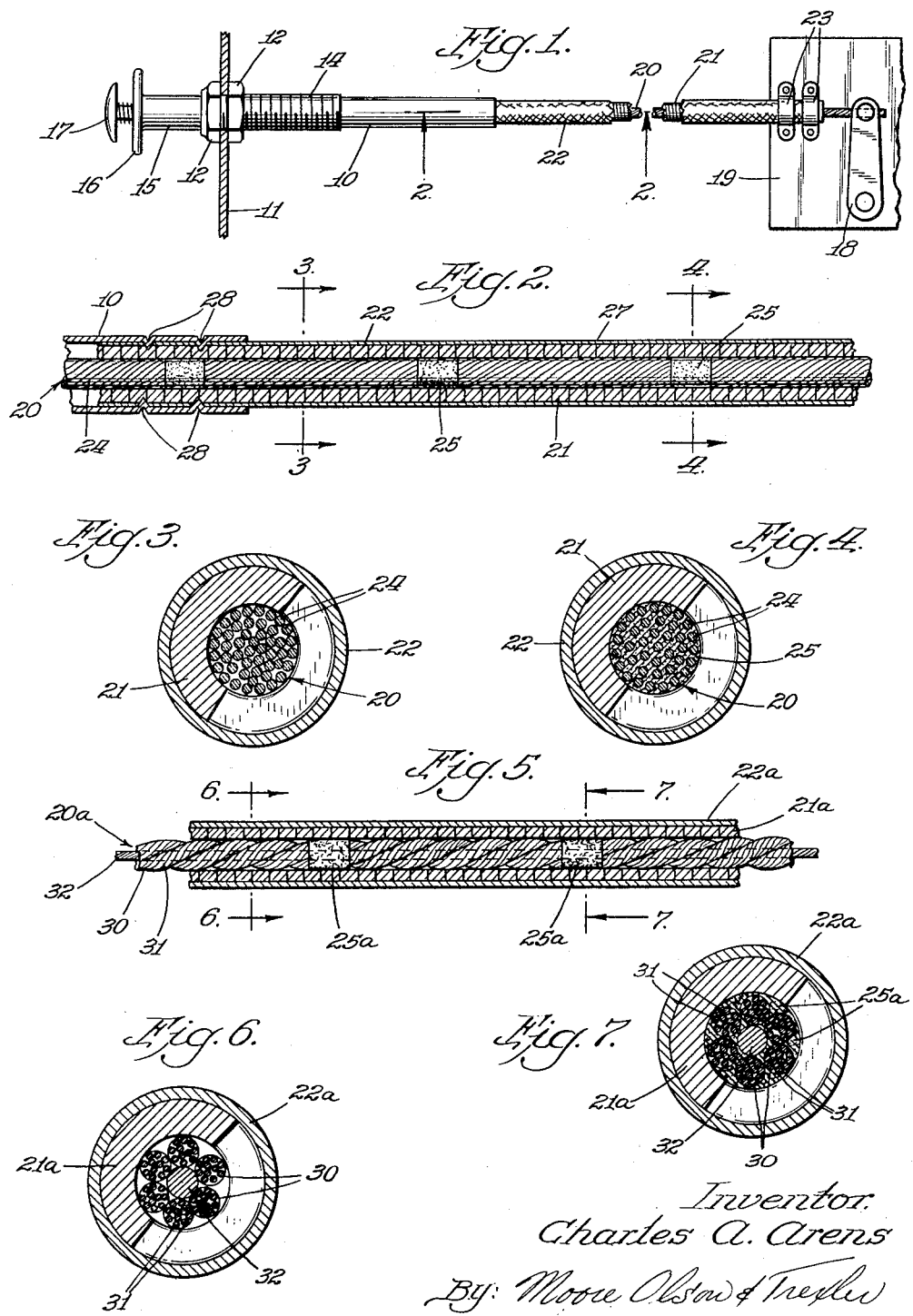

2,519,812

UNITED STATES PATENT OFFICE 2,519,812

TRANSMISSION CABLE

Charles A. Arens, Winamac, Ind.

Application November 14, 1946, Serial No. 709,855

16 Claims. (Cl. 74—501)

The present invention relates to new and useful improvements in cable constructions and more particularly to improvements in transmission cables of the type adapted for the transmission of mechanical power in various types of installations.

In general, the invention contemplates the provision of a transmission cable for transmitting reciprocating power strokes. The cable assembly includes an inner core member which acts as the movable part for transmitting the power strokes. This core is of a flexible construction and is enclosed within an outer sheath which is also of flexible construction. The entire cable assembly may be enclosed within any suitable type of covering such as a rubberized or lacquer impregnated fabric covering to protect the same against moisture, foreign material and the like. The entire cable assembly may be flexed to adapt it for any installation necessitating the bending thereof to provide the connection between the control member and the member or device to be controlled.

It is an object of the present invention to provide a transmission cable of the above type which is of new and improved construction and which possesses improved operating characteristics.

More specifically, the invention aims to provide a transmission cable of the above type which is more positive and more accurately responsive in its control transmitting movements, and which provides an inner power transmitting core of improved structure.

Another object of the invention is to provide a transmission cable of the above type which is constructed and arranged so as to substantially eliminate any tendency for the inner core to buckle or "birdcage" under compressive forces.

A still further object of the invention is to provide a transmission cable of the above type wherein the inner power transmitting core is reinforced at intervals to effectively prevent buckling thereof under compressive forces.

A still further object of the present invention is to provide a transmission cable of the above type wherein the desired flexibility is retained for any desired installation and frictional resistance is maintained at a minimum.

The invention still further aims to provide a transmission cable of the above type which is of relatively simple construction, which is easily assembled, and which is reliable and durable in use.

The above and various other objects, advantages and features of the invention will be apparent from the following specification when taken in connection with the accompanying drawing wherein certain preferred embodiments of the invention are set forth for purposes of illustration.

In the accompanying drawing, wherein like reference numerals refer to like parts throughout:

Figure 1 is a general assembly view showing one type of control mechanism which incorporates therein a transmission cable constructed in accordance with the principles of the present invention;

Figure 2 is an enlarged longitudinal sectional view taken substantially along the line 2—2 of Figure 1 and illustrating the details of construction of one form of transmission cable constructed according to the present invention;

Figure 3 is a further enlarged transverse sectional view taken along the line 3—3 of Figure 2;

Figure 4 is a sectional view, similar to Figure 3, but taken along the line 4—4 of Figure 2 and showing the bonded area of the transmission core;

Figure 5 is a fragmentary longitudinal sectional view, similar to Figure 2, but showing a modified embodiment of transmission cable constructed according to the present invention;

Figure 6 is an enlarged transverse sectional view taken along the line 6—6 of Figure 5; and Figure 7 is a transverse sectional view, similar to Figure 6, but taken along the line 7—7 of Figure 5 and showing the bonded area of the transmission core.

In the drawing, the transmission cable assembly of the present invention has been shown as incorporated in a control mechanism of the type which may be utilized for operating the controls of vehicles or the like. It is to be clearly understood, however, that the transmission cable of the present invention is of more general utility and may be adapted for use with various types of installations wherein it is necessary to accurately transmit reciprocating control and operating movements to a device to be controlled and operated.

Thus, as shown in Figure 1, the control mechanism includes a sleeve member or bracket 10 which is illustrated as extending through a dash, instrument or panel board 11 and is secured thereto by a pair of clamp nuts 12 engaging a threaded portion 14 thereof on opposite sides of the panel 11. Slidably mounted within the sleeve 10 is an operating member or control 15 which is adapted to be longitudinally reciprocated through the dash or panel board 11. The operating member 15 may be provided with a handle portion 16 to facilitate manipulation thereof and a locking and release button 17 by means of which the operating member is locked or held in various positions of adjustment. The control mechanism may be of any suitable type but is illustrated as being of the type shown in the patent to C. A. Arens. No. 2,161,661, dated June 6, 1939. The device to be operated or controlled is illustrated in this instance as being a lever 18 pivotally mounted on a casing or support 19 for the controlled mechanism (not shown). The cable assembly extending between the operating member and the device to be controlled includes generally a transmission core 20 connected to the lever 18 and the operating member 15, a sheath 21 and a covering 22. The covering 22 and sheath 21 have one end secured to the casing 19 by clamping brackets 23 or the like and the opposite ends are secured to the sleeve member 10.

One form of transmission cable by which movements of the control member are transmitted to the controlled member may be constructed in accordance with the form of the invention shown in Figures 2, 3 and 4 to which reference is now made. As illustrated therein, the cable assembly includes the central core member, generally indicated by the numeral 20, which comprises a cable formed of a plurality of stranded and wound wires 24. Under ordinary circumstances, as will be readily understood, this form of cable possesses relatively low resistance to compressive forces and will readily bend or tend to "birdcage" upon the application of such forces. However, according to the present invention, this relative weakness in compression resistance is overcome while retaining the desired characteristics of such a cable, as for instance, its flexibility, which adapts such an assembly to various installations requiring bending of the cable. Thus, at relatively short intervals along the length of the transmission core, the stranded wires 24 are intimately bound together to provide spaced binding or reinforcing bands or rings 25. These areas or bands may be provided in various ways. Thus, the bands may be formed by bonding the wires in the spaced areas with solder which, as illustrated in Figure 4, is forced through the core so that each of the wire strands 24 is intimately connected to the other adjacent strands so that relative movement, either by way of longitudinal sliding or radial shifting, between the strands in this bonded area is effectively prevented. The bonding may be effected by the use of pitch, glue or the like or by brazing. Similarly, a mechanical bonding to prevent relative movement between the wire strands may be employed. This construction has proved to be very effective in preventing expansion or buckling of the wire strands and adapts the core for resistance to compressive forces while maintaining frictional resistance with the sheath at a minimum.

The power transmitting core 20 is surrounded by the outer sheath coil 21 which is illustrated as being formed of convoluted, helically wound wire coils of substantially rectangular cross section. The sheath coil is thus flexible and may be bent or curved to any desired shape to meet the installation requirements for any particular mounting or relative location of the control member and the device to be controlled or operated. In installations where it is known that flexibility will not be required, the sheath may be in the form of a rigid tube of any suitable material. As shown in Figure 2, the inner end of the sleeve member 10 may be punched, as at 28, to secure the ends of the sheath and outer covering against movement, it being understood that the transmission core 20 is movable within the sheath. The sheath coil is enclosed within any suitable type of covering 22 which may be of fabric, flexible plastic or the like, and in the case of fabric, it may be impregnated with any suitable type of waterproofing material to provide a protective and waterproof coating or covering for the sheath and the core. Rubber treated or lacquer impregnated materials may be conveniently utilized.

There is thus provided a core member which is movable relative to the outer sheath so as to transmit longitudinally reciprocating power strokes imparted thereto. The intervals of reinforcement or bonding of the stranded wires 24 is relatively short and may be spaced apart about one wire pitch distance or less. In employing, for instance, standed cable #10 which is ⅛ inch in diameter, the bonding bands may be disposed between ⅝ and ¾ inch apart. The bonding material is substantially flush with the outside diameter of the core and the spacing of such bands should be selected so as to render the transmitting core capable of absorbing maximum compression loads without buckling and yet, at the same time, retain sufficient flexibility to allow the cable assembly to be bent for the requirements of any particular installation of the control mechanism.

In Figures 5, 6 and 7, a modified structural embodiment of the invention is illustrated and is generally similar to that previously described except for the showing of a modified form of transmission core. In this form of the invention, the sheath coil 21a and the outer covering 22a may be of the same type described in connection with Figures 2, 3 and 4. However, the transmission core in this form of the invention is more particularly adapted for heavy duty power transmission and is in the form of a cable including a plurality of sections 30 each consisting of a plurality of wound wire strands 31. The sections are wound around a central core 32 which may be rope or the like. The rope core 32 is not for the purpose of assuming tensile or compressive stresses but rather for the purpose of maintaining the cable sections 30 in properly spaced peripheral relationship. The rope core may serve as somewhat of a cushion permitting slight inward movement of the wound sections 30 so as to reduce friction to a minimum during longitudinal reciprocating movements of the core within the sheath. As illustrated, the core consists of a 6/11 cable, that is, one which includes six sections, each section having eleven wires. In this form of the invention, the composite inner or power transmitting core is also bound together at intervals to prevent any tendency thereof to spread or buckle under compressive stresses. The bonding areas or bands may be spaced in the manner described above, that is, within approximately one pitch distance, or less, of the cable sections 30.

In the operation of either of the illustrated structural embodiments, it will be seen that the transmission core constitutes a substantially one-piece structure which is shiftable as a unit within the sheath coil so as to accurately transmit the required reciprocating control movements. The ends of the transmission core may also be bonded by one of the reinforcing bands so as to prevent fraying of the ends. The overall length of the cable remains substantially constant throughout the life thereof so as to obviate the necessity of effecting adjustments thereof. The cable construction of either illustrated form of the invention is such as to retain the desirable flexibility of stranded wire while overcoming the normal tendency of such stranded wire to become distorted under compression. Thus, the stranded core member may be employed in exceptionally long lengths.

While one form of the invention has been shown for purposes of illustration, it is to be clearly understood that various changes in the details of construction and arrangement of parts shown in the illustrated embodiments may be made without departing from the spirit of the invention. The invention is, accordingly, not to be limited to the precise embodiment shown and described, but only as indicated in the following claims.

I claim:

1. A transmission cable for transmitting tensile and compressive mechanical power and comprising an elongated core including a group of wire strands, means having an external diameter substantially that of the group of strands for intimately joining said strands as a unitary structure over limited areas spaced longitudinally of said core whereby to resist distortion thereof under compression while maintaining desired flexibility, and a sheath within which said core is longitudinally slidable.

2. A transmission cable for transmitting tensile and compressive mechanical power and comprising an elongated core including a plurality of wire strands, and means disposed between the strands and extending through substantially the entire body thereof for bonding said wire strands together as a unitary structure over limited areas spaced longitudinally of said core whereby to resist distortion thereof under compression while maintaining desired flexibility, and a sheath within which said core is longitudinally slidable.

3. A transmission cable as defined in claim 2, wherein said bonding means comprises solder.

4. A transmission cable as defined in claim 2, wherein said bonding means comprises an adhesive bonding material.

5. A flexible transmission cable adapted to transmit control movements and comprising an elongated core including a plurality of wire strands, means comprising a body of material within which substantially the entire body of strands is imbedded for intimately connecting said strands as a unitary structure over limited areas spaced longitudinally of said core whereby to resist distortion thereof while permitting flexing thereof, and a sheath within which said core is movable for transmitting the control movements.

6. A flexible transmission cable adapted to transmit control movements and comprising an elongated core member including a group of helically wound wires, means disposed substantially flush with the exterior surfaces of said group of wires for intimately securing the said wires together over limited areas spaced apart longitudinally of said core member a distance of substantially one wire pitch whereby to resist distortion of said wire while maintaining desired flexibility, and a sheath within which said core member is movable for transmitting the control movements.

7. A flexible transmission cable adapted to transmit control movements and comprising an elongated core including a plurality of wire strands, a bonding material extending through substantially the entire body of said core at limited areas spaced longitudinally thereof for intimately uniting the said wires whereby to resist distortion of said core while maintaining desired flexibility, and a sheath within which said core is movable for transmitting the control movements.

8. A flexible transmission cable as claimed in claim 7, wherein the bonding material is disposed at areas spaced apart longitudinally of said core member a distance of substantially one wire pitch.

9. A transmission cable for transmitting control movements and comprising a core including a plurality of helically wound cable sections, a core element disposed within said sections and maintaining the same in proper position, means having an external diameter substantially that of the collective cable sections for securing said sections together at intervals spaced longitudinally of the said core whereby to resist distortion while permitting desired flexibility, and a sheath within which said core is movable for transmitting the control movements.

10. A transmission cable for transmitting control movements and comprising a core having a plurality of cable sections each including a plurality of wire strands, a core element on which said sections are helically wound, a bonding material extending through substantially the entire body of said core at intervals spaced longitudinally thereof for intimately uniting the said sections and the wire strands thereof whereby to resist distortion while permitting desired flexibility, and a sheath within which said core is movable for transmitting the control movements.

11. A transmission cable as claimed in claim 10, wherein the bonding material is disposed over limited areas spaced apart longitudinally of the said core member a distance of substantially the pitch of said cable sections.

12. A flexible transmission cable for assuming tensile and compressive loads in transmitting control movements and comprising an elongated core including a plurality of wound wire strands, a sheath within which said core is slidable for transmitting the control movements, and means disposed longitudinally of said core at relatively short intervals for binding together the wire strands whereby to resist distortion of the remaining portions of said wire strands while retaining desired flexibility thereof, said sheath having sliding contact with said wire strands between the binding means.

13. A flexible transmission cable as claimed in claim 12, wherein the wire strands are bound together by a bonding means intimately and individually uniting said wire strands along the core at intervals not exceeding one wire pitch.

14. A flexible transmission cable as claimed in claim 12, wherein the core consists of a plurality of stranded wire cable sections wound around a flexible core element, and wherein said cable sections and the wire strands thereof are intimately and individually connected by bonding material disposed along said core at relatively short intervals not exceeding the pitch distance of the cable sections.

15. A transmission cable core for transmitting tensile and compressive mechanical power within a sheath within which the core is arranged for longitudinal sliding movement, said core comprising an elongated group of wire strands, and means having an external diameter substantially that of the group of strands for intimately joining said strands as a unitary structure over limited areas spaced longitudinally of said core, whereby to resist distortion thereof under compression while maintaining desired flexibility.

16. A transmission cable core for transmitting tensile and compressive mechanical power within a sheath within which the core is arranged for longitudinal sliding movement, said core comprising an elongated group of wire strands, and means disposed between the strands and extending through substantially the entire body thereof for bonding said wire strands together as a unitary structure over limited areas spaced longitudinally of said core, whereby to resist distortion thereof under compression while maintaining desired flexibility.

CHARLES A. ARENS.

REFERENCES CITED

The following references are of record in the file of this patent:

UNITED STATES PATENTS

| Number | Name | Date |
|---|---|---|
| 1,049,233 | Herzmark | Dec. 31, 1912 |
| 2,036,528 | Kesling | Apr. 7, 1936 |
| 2,388,241 | Arens | Nov. 6, 1945 |

FOREIGN PATENTS

| Number | Country | Date |
|---|---|---|
| 361,801 | Great Britain | Nov. 26, 1931 |